(12) United States Patent
Elman

(10) Patent No.: US 6,641,873 B2
(45) Date of Patent: Nov. 4, 2003

(54) METHOD OF FORMING A DISPLAY USING CHOLESTERIC MATERIAL

(75) Inventor: James F. Elman, Fairport, NY (US)

(73) Assignee: Eastman Kodak Company, Rochester, NY (US)

(*) Notice: Subject to any disclaimer, the term of this patent is extended or adjusted under 35 U.S.C. 154(b) by 101 days.

(21) Appl. No.: 10/036,730

(22) Filed: Dec. 21, 2001

(65) Prior Publication Data

US 2003/0116751 A1 Jun. 26, 2003

(51) Int. Cl.[7] .................. C09K 19/52; G02F 1/1333
(52) U.S. Cl. ............... 428/1.3; 428/1.4; 252/299.01; 349/88; 349/111; 430/20
(58) Field of Search .................. 349/44, 88, 111; 430/20, 62, 66, 325; 252/299.01; 428/1.4, 1.3

(56) References Cited

U.S. PATENT DOCUMENTS

| | | | |
|---|---|---|---|
| 4,435,047 A | 3/1984 | Fergason | 349/86 |
| 5,437,811 A | 8/1995 | Doane et al. | 252/299.01 |
| 5,986,729 A * | 11/1999 | Yamanaka et al. | 349/79 |

FOREIGN PATENT DOCUMENTS

WO    WO 97/04398    2/1997

\* cited by examiner

Primary Examiner—Shean C. Wu
(74) Attorney, Agent, or Firm—Raymond L. Owens

(57) ABSTRACT

A method of making a display includes providing a transparent support and providing a conductive transparent layer formed thereover; patterning the transparent conductive layer; and coating a soluble layer including liquid crystal material dispersed in a polymer matrix over the patterned transparent layer and drying such coated soluble layer. The method further includes providing an opaque hydrophobic conductive layer over the dried coated soluble layer; patterning the opaque hydrophobic layer to form conductors leaving exposed portions of the transparent dried coated soluble layer, the position of the conductors relative to the transparent conductive layer defines image pixels; and removing by a solvent the exposed portions of the dried coated soluble layer so that when a potential for each pixel is applied between the patterned transparent conductive layer and patterned corresponding opaque hydrophobic conductors, an image is provided by the dried coated soluble layer which is viewable by an observer.

7 Claims, 2 Drawing Sheets

METHOD OF FORMING A DISPLAY USING CHOLESTERIC MATERIAL

FIELD OF THE INVENTION

The present invention relates to liquid crystal displays and, more particularly, to a liquid crystal display, which produces a more esthetically pleasing image.

BACKGROUND OF THE INVENTION

Liquid crystal displays are well known in the art and have many applications. They are found in watches, clocks, and provide the display for many devices. In one particular type of display using a liquid crystal, an image is preformed in a patterned transparent conductive layer and a liquid crystal layer is coated over such patterned transparent conductive layer. Currently, information is displayed using assembled sheets of paper carrying permanent inks or displayed on electronically modulated surfaces such as cathode ray displays or liquid crystal displays. Other sheet materials can carry magnetically written areas carrying ticketing or financial information, however magnetically written data is not visible.

A structure is disclosed in PCT/WO 97/04398, entitled "Electronic Book With Multiple Display Pages" which includes a recitation of prior art of thin, electronically written display technologies. Disclosed is the assembling of multiple display sheets that are bound into a "book", each sheet provided with means to individually address each page. In PCT/WO 97/04398 prior techniques are set forth for forming thin, electronically written pages, including flexible sheets, image modulating material formed from a bi-stable liquid crystal system, and thin metallic conductor lines on each page. The device described requires " . . . transparent conducting polymers . . . ". It would be advantageous to generate a display sheet that could use opaque electrical conductors that were printed.

Fabrication of flexible, electronically written display sheets is disclosed in U.S. Pat. No. 4,435,047. A first sheet has transparent indium-tin-oxide (ITO) conductive areas and a second sheet has electrically conductive inks printed on display areas. The sheets can be glass, but in practice have been formed of Mylar polyester. A dispersion of liquid crystal material in a binder is coated on the first sheet, and the second sheet is pressed onto the liquid crystal material. Electrical potential applied to opposing conductive areas operates on the liquid crystal material to expose display areas. The display ceases to present an image when de-energized. Currently, Taliq products form electrical interconnection by offsetting the two sheets and contacting trace conductors from each of the two sheets.

The prior art typically requires multiple, separate layers to build up the display. The electrical traces and transparent conductive layers are typically formed through repeated vacuum deposition and photolithography of materials on the substrate. These processes are expensive and require long processing times on capital intensive equipment. Because most display structures are formed of glass, two sheets are used and are offset to permit connection to two separate and exposed sets of traces that are disposed on separate sheets.

The prior art discloses isolating each conductor on separate sides of the display, and connecting the traces to drive electronics using solder connections, wire bonds or pressure contact. Such connections do require that both sets of traces be exposed on a surface for the connection process. The uniform, multilayer structure prevents connection to the inner conductive layer.

In the case of electronic display means, power must be provided to view images. Printed sheets receive ink and cannot be rewritten. In the case of magnetically written media such as magnetic areas on the back of credit cards, the information is not readable. It would be advantageous to provide a flexible sheet that can be rewritten using electronic techniques. While these devices are now available and effective, they still have deficiency in image quality.

SUMMARY OF THE INVENTION

It is an object of the present invention to provide a simple yet effective method for improving the image quality of a liquid crystal display.

This object is achieved by A method of making a display, comprising the steps of:

a) providing a transparent support and providing a conductive transparent layer formed thereover;

b) patterning the transparent conductive layer;

c) coating a soluble layer including liquid crystal material dispersed in a polymer matrix over the patterned transparent layer and drying such coated soluble layer;

d) providing an opaque hydrophobic conductive layer over the dried coated soluble layer;

e) patterning the opaque hydrophobic layer to form conductors leaving exposed portions of the transparent dried coated soluble layer, the position of the conductors relative to the transparent conductive layer defines image pixels; and f) removing by a solvent the exposed portions of the dried coated soluble layer so that when a potential for each pixel is applied between the patterned transparent conductive layer and patterned corresponding opaque hydrophobic conductors, an image is provided by the dried coated soluble layer which is viewable by an observer.

ADVANTAGES

The present invention, by the addition of a simple solvent removing step, permits improvement in image quality by changing the spectral response of the display by removing the exposed portions of the dried coated water soluble layer so as to minimize haze and improve the clarity of the image when viewed by an observer.

DETAILED DESCRIPTION OF THE INVENTION

Figure 1:
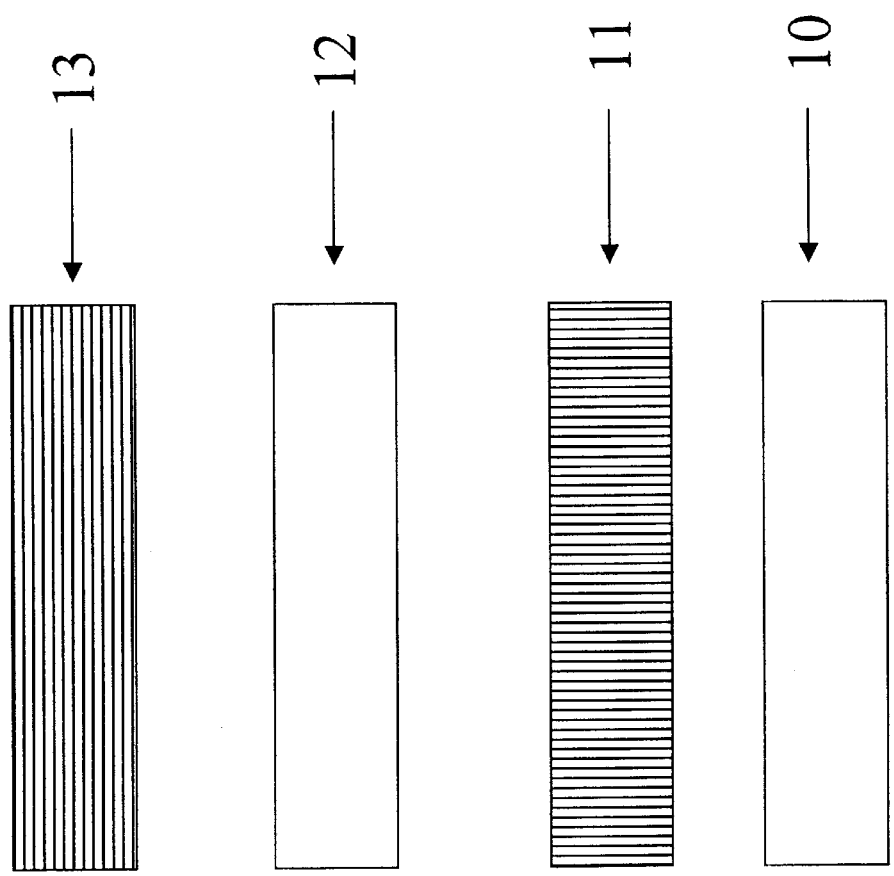
FIG. 1 is a partially exploded view of a portion of a display made in accordance with the present invention.

Turning now to FIG. 1, there is shown a transparent substrate 10 which can be made of a polymeric type material such as common polyesters (polyethyleneterephthalate, polyethylenenaphthalate), and other polymers (polystyrene, polycarbonate) or blends of such polymers.

The transparent, electrically conductive layer 11 can be formed of tin-oxide or indium-tin-oxide (ITO), with ITO being the preferred material. Typically, the transparent, electrically conductive layer 11 is vacuum sputtered onto the substrate 10 to a resistance of less than 250 ohms per square. The transparent electrically conductive layer is patterned in a well known manner by using a laser beam to remove portions of the ITO. Those skilled in the art will recognize that an ITO layer can readily be patterned by the application of a laser light beam. The position of the patterned opaque hydrophobic conductive layer 13 relative to the patterned transparent conductive layer defines image pixels. A transparent dried coated soluble layer 12 is deposited over transparent, electrically conductive layer 11. The liquid crystal materials are chiral doped nematic liquid crystal, also known as cholesteric liquid crystals, dispersed in a polymeric binder. These types of liquid crystal molecules can align in a planar structure and the chirality of the molecules set to reflect a given wavelength of visible light.

Cholesteric liquid crystals and their states of operation are fully discussed in U.S. Pat. No. 5,437,811, the disclosure of which is incorporated by reference herein. Chiral nematic materials are superior to undoped nematic crystals having incorporated dichroic dyes because chiral doped nematic materials maintain a given state between reflective to transparent states when the electrical drive field is removed.

The polymer matrix for the liquid crystal cholesteric material can be gelatin. Other aqueous, film forming polymers could also be used (i.e. polyvinylalcohol).

A patterned opaque hydrophobic conductive layer 13 is formed over the transparent dried coated soluble layer 12. The patterned opaque hydrophobic conductive layer 13 can include a wide variety of organically soluble polymers formulated with a light adsorbing filler (i.e. carbon black).

In an experiment, Electrodag 423SS screen printable electrical conductive material from Acheson Corporation was used to form conductive areas 13. The material was finely divided graphite particles in a thermoplastic resin. The ink was not heated, only air dried to form a coating between 25 and 75 microns. Each conductive area 13 was separated from adjacent conductive areas by nonconductive areas. Nonconductive areas are typically 50–100 microns wide. The effective sheet conductivity of the patterned opaque hydrophobic conductive layer 13 was less than 250 ohms per square. Patterned opaque hydrophobic conductive layer 13 was highly light absorbing, typically having an optical density of greater than 2.0 D. The light absorbing property of the patterned opaque hydrophobic conductive layer 13 in the experiment was adequate to serve as light absorber for the cholesteric liquid crystal material. Patterned opaque hydrophobic conductive layer 13 is typically applied by use of silk screening techniques.

The transparent dried coated soluble layer 12 is patternable by the application of a solvent which is preferably water, although other solvents will suggest themselves to one skilled in the art. A water based polar solvent can be applied to the exposed portions of the transparent dried coated soluble layer. The patterning of the transparent dried coated soluble layer 12 that is not protected by the patterned opaque hydrophobic conductive layer 13 is accomplished by simply placing the display in water (20–40 degrees C.) with very mild agitation. Those parts of the transparent dried coated soluble layer 12 that are in direct contact with the water dissolve leaving the patterned conductive transparent layer 11. Those parts of the transparent dried coated soluble layer 12 that are under the patterned opaque hydrophobic conductive layer 13 (which acts as a template) do not dissolve as layer 13 is insoluble with water.

After the patterned opaque hydrophobic conductive layer 13 is patterned by using a silk screen technique solvent that removes the exposed portions of the dried coated soluble layer 12 so that when a potential for each pixel is applied between the patterned transparent conductive layer and patterned corresponding opaque hydrophobic conductors, an image is provided by the dried coated soluble layer which is viewable by an observer.

Figure 2:
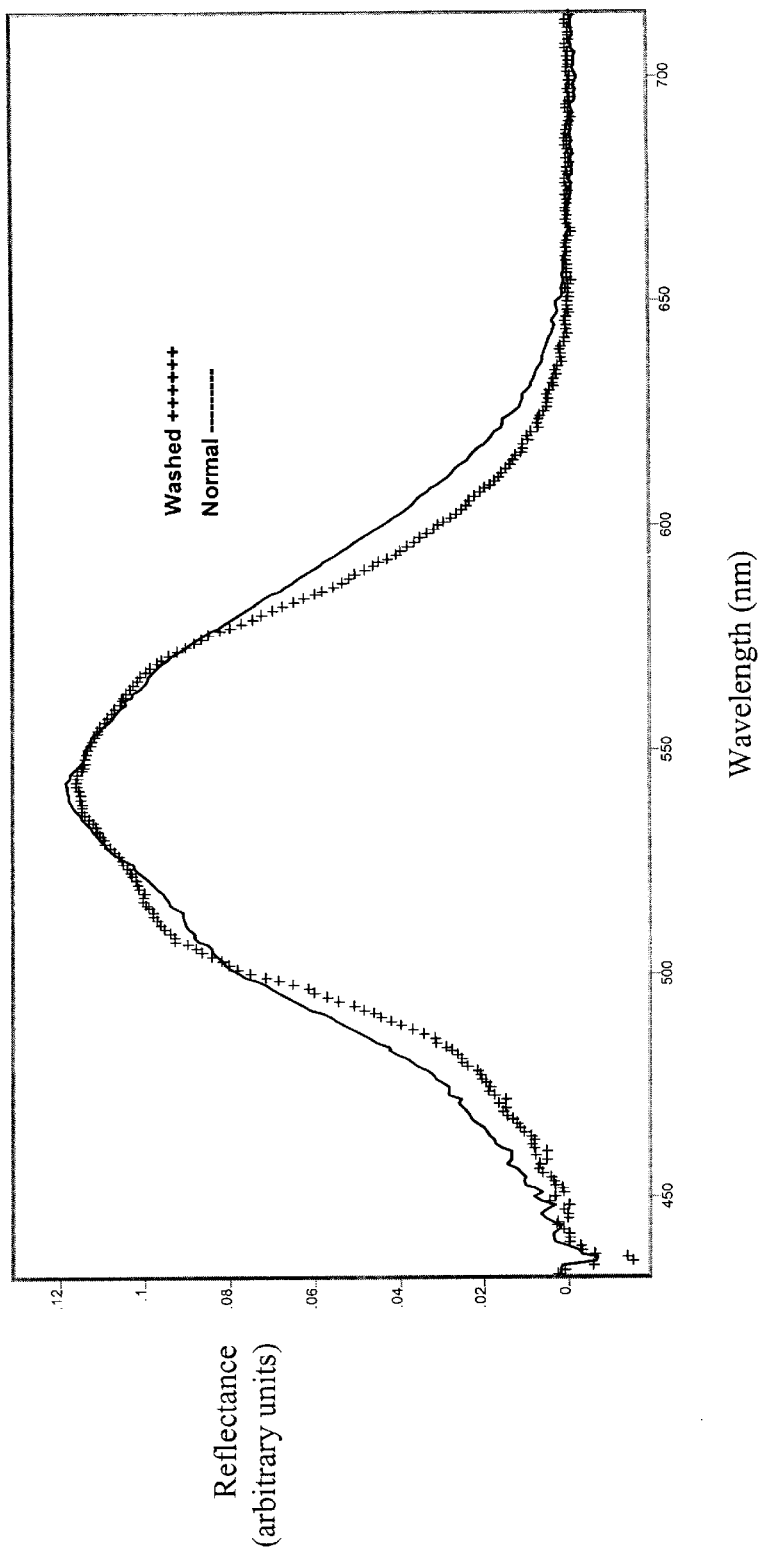
FIG. 2 is a representative spectral response curve of the display in FIG. 1 plotting reflectance v. wavelength before (normal) and after (washed) the removal of the exposed portions of the dried coated soluble layer showing improved spectral response.

The present invention has, as an advantage, a much narrower bandwidth, which improves image quality. This is shown in FIG. 2, which shows two spectra: the spectral response of the display before (designated normal); and after (designated washed) the solvent removal step. Note that the wavelength of greatest reflective intensity does not move. However, the shape of the peak does change. After the solvent removal step the peak is now narrower providing a purer color. This is because the solvent removal step removes the parts of the transparent dried coated soluble layer 12 that do not have a black background provided by the patterned opaque hydrophobic conductive layer 13.

Alternatively, the step removing by a solvent the exposed portions of the dried coated soluble layer so that when a potential for each pixel is applied between the patterned transparent conductive layer and patterned corresponding opaque hydrophobic conductors, thereby providing an image, is provided by the dried coated soluble layer which is viewable by an observer can be performed before the following patterning step. This patterning step includes patterning the opaque hydrophobic layer to form conductors leaving exposed portions of the transparent dried coated soluble layer, the position of the conductors relative to the transparent conductive layer defines image pixels.

The invention has been described in detail with particular reference to certain preferred embodiments thereof, but it will be understood that variations and modifications can be effected within the spirit and scope of the invention.

PARTS LIST 10 transparent substrate
11 patterned conductive transparent layer
12 dried coated soluble layer
13 patterned opaque hydrophobic conductive layer

What is claimed is:

1. A method of making a display, comprising the steps of:
   a) providing a transparent support and providing a conductive transparent layer formed thereover;
   b) patterning the transparent conductive layer;
   c) coating a soluble layer including liquid crystal material dispersed in a polymer matrix over the patterned transparent layer and drying such coated soluble layer;
   d) providing an opaque hydrophobic conductive layer over the dried coated soluble layer;
   e) patterning the opaque hydrophobic layer to form conductors leaving exposed portions of the transparent dried coated soluble layer, the position of the conductors relative to the transparent conductive layer defines image pixels; and
   f) removing by a solvent the exposed portions of the dried coated soluble layer so that when a potential for each pixel is applied between the patterned transparent conductive layer and patterned corresponding opaque hydrophobic conductors, an image is provided by the dried coated soluble layer which is viewable by an observer.

2. The method of claim 1 wherein the removing step includes applying a water based polar solvent to the exposed portions of the transparent dried coated soluble layer.

3. The method of claim 1 wherein the liquid crystal material is a cholesteric liquid crystal material.

4. The method of claim 1 wherein the hydrophobic conductors are effective to provide a protective coating.

5. The method of claim 1 wherein step f) is performed before step e).

6. A method of making a display, comprising the steps of:
   a) providing a transparent support and providing a conductive transparent layer formed thereover;
   b) patterning the transparent conductive layer;
   c) coating a soluble layer including liquid crystal material dispersed in a polymer matrix over the patterned transparent layer and drying such coated soluble layer;
   d) providing an opaque hydrophobic conductive layer over the dried coated soluble layer;
   e) patterning the opaque hydrophobic layer to form conductors leaving exposed portions of the transparent dried coated soluble layer, the position of the conductors relative to the transparent conductive layer defines image pixels; and
   f) removing by a polar solvent the exposed portions of the transparent dried coated soluble layer so that when a potential for each pixel is applied between the patterned transparent conductive layer and patterned corresponding opaque hydrophobic conductors, an image is provided by the transparent dried coated soluble layer which is viewable by an observer, whereby the removal of the exposed portions of the transparent dried coated soluble layer will cause a change in the spectral response of an image viewed by an observer.

7. The method of claim 6 wherein the removing step includes applying a water based polar solvent to the exposed portions of the transparent dried coated soluble layer.

* * * * *